2,797,169
NON-DUSTING ASPHALTIC COATINGS

Edward W. Mertens, El Cerrito, Calif., assignor to California Research Corporation, San Francisco, Calif., a corporation of Delaware No Drawing. Application May 11, 1953,
Serial No. 354,395

6 Claims. (Cl. 106—273)

Present invention relates to improved asphaltic compositions suitable for application as thin roof coatings, lacquers, enamels, and paints, and pertains more particularly to such compositions which have superior resistance to weathering.

Asphalt has been used extensively in forming protective coatings for roofs and the like. It has long been the object of the art to produce such asphaltic coatings which, upon exposure to the elements of sun, rain, wind, and cold, will not only provide perfect waterproofing and protection of the understructure for long periods of time but will also retain a pleasing appearance free from discoloration, cracks, pinholes, wrinkling, etc. One example of unsatisfactory weathering of thin asphalt coatings is termed "rust," a yellow paint-like appearance taken on by exposed asphalt coating upon immersion in warm water. The tendency of asphalt surfaces to become wrinkled, particularly on vertical surfaces due primarily to the flow of the asphalt, can be designated as "rugosity," and the tendency to form fine rugae extensively over an asphaltic coating surface can be termed "rugolosity."

Another manifestation of poor weathering properties of thin asphaltic coatings, and one that is particularly difficult to prevent, is the formation of dust on the surface of asphalt coatings used on roofs, walls, and other surfaces which are exposed to the elements. Dust formation is believed to be caused by the conjoint action of ultraviolet light, air, and moisture. Aside from any other change which may occur in thin asphaltic coatings when exposed out of doors, dust formation is objectionable not only because of the resulting poor appearance but also because of the actual wearing away of the thin coating itself. The speed with which this wearing process occurs is, in all probability, a prime factor insofar as the ultimate life of the coating is concerned. Such disintegration becomes particularly critical in thin asphaltic coatings which are expected to provide lasting protection for the underlying structure. Heretofore, no commercially satisfactory method of substantially reducing dust formation has been available.

We have found that many agents proposed for various purposes such as oxidation inhibition in non-asphaltic systems are not appreciably effective in minimizing dust formation of thin coatings of asphalt in general. For example, an air-blown asphalt having a softening point of 230° F. and containing 1% of diphenylamine rapidly lost its glossiness of surface within a relatively short period of exposure to outdoor weather.

We have now discovered that exceptional resistance to dust formation in thin asphaltic coatings can be obtained by incorporating therein a small amount of a unique group of diaryl amine derivatives having a plurality of bivalent amino, thio, or oxy radicals attached to the aryl nuclei and preferably between two aryl nuclei. These agents are: thio-diphenylamine, N,N'-diphenyl-para-phenylene diamine and para-isopropoxy diphenylamine.

These agents are incorporated in the asphalt which forms the major portion of the thin coating composition in an amount sufficient to inhibit dust formation substantially. Effective amounts normally range from about 0.1 to 2.0% by weight and in some cases the dust inhibitors can be satisfactorily employed in amounts as low as 0.025%. Ordinarily amounts as high as 5% or more are not necessary although such large amounts are within the scope of this invention.

The dust inhibitors can be incorporated in the asphalt in any suitable manner such as by melting the asphalt and dispersing therein the crystalline or powdered dust inhibiting agent. In some instances it is convenient and may be beneficial to disperse the dust inhibitors in the molten asphalt as a paste, such as can be formed by milling the powdered or crystalline inhibtor in a mineral lubricating oil.

Asphalts suitable for use in my non-dusting thin coating compositions can have softening points somewhat below 185° F., in some instances as low as 120° F. However, the harder asphalts, i. e., those having softening points above 200° F., are preferred, particularly when no extender is incorporated in the asphaltic composition. Likewise, for ordinary purposes of the present invention it is preferred to employ asphalt having a softening point below 250° F. although the very hard asphalts having softening points up to about 295° F. can be employed to advantage for some applications.

The asphalts include refined asphalts produced by steam refining, by solvent reaction methods, by air-blowing processes, and by combinations of these methods, and natural asphalts. Of the various types of asphalts, it is preferred to employ for the purposes of the present invention the air-blown asphalts since they possess the desirable low temperature susceptibility, a higher melting point for a given penetration as compared with unoxidized asphalts, and a moderately high ductility. The air-blown asphalts in combination without anti-dusting agents generally have the greater stability and resistance to flow, which is particularly important to have in thin coatings applied to other than horizontal surfaces.

The foregoing combination of an asphalt and dust-inhibitor selected from the group consisting of thio-diphenylamine, N,N'-diphenyl-p-phenylenediamine, and p-isopropoxy diphenyl-amine are the essential ingredients of the compositions of the present invention. Thus, the minimum composition consists of asphalt having dispersed uniformly therein a small amount of the selected dust inhibitor. However, it is not intended to exclude the addition of other ingredients. Thus, the foregoing combination can be liquefied for cold application by mixing with a suitable thinner such as petroleum distillates, coal tar naphtha, benzol, etc., to form cut-back asphalts. Also extenders or fillers can be included in the thin asphaltic coating compositions of the present invention. For example, the coating composition can contain 5 to 60% by weight of granular or non-fibrous extenders, such as limestone, flue dust, slate flour, talc, ground silica, mica, aluminum silicate ore, slate dust, diatomaceous earth, etc., or 1 to 10% by weight of fibrous extends such as asbestos, mineral wool, shredded rags, beet sugar residues, paper fibers, corn stalks, etc. Normally the dust inhibited asphalt constitutes the major proportion of the final coating composition, although in some cases with large amounts of extender somewhat less than a majority but still a substantial proportion of the final composition is the dust-inhibited asphalt.

Particularly desirable as an additional ingredient in the present coating compositions is a basic-reacting material, when the asphalt is an air-blown asphalt and the oxidation has been accelerated or promoted by means of catalysts such as those disclosed and claimed in Abson Patent No. 1,782,186. As disclosed in this patent, the introduction of small quantities of chlorides of zinc, iron, copper or antimony, as well as the sulfates and carbonates of these metals in the regular process of air-blowing or oxidation changes and accelerates the reaction. It has been found that at least part of the improvement obtained by adding the basic reacting material is due to the chemical reaction thereof with the presumably acidic material contained in the air-blown asphalt, for example, the naturally-occurring low molecular weight acids, inorganic salt residues from crude distillation, or residua of air-blowing oxidation catalysts remaining in the asphalt after its catalytic oxidation. Sufficient of the basic reacting material is incorporated in the composition to neutralize substantially the acidic material contained in the catalyzed air-blown asphalt. The added basically-reacting material can be either an insoluble extender such as limestone, or a soluble agent. The soluble agent may be added together with an inert solid extender or by itself, and suitably can be an organic base such as an aliphatic amine, especially a primary amine such as butyl amine, octyl amine, cetyl amine, polyalkylene polyamines such as diethylene triamine or other strong base amines such as morpholine, dioctadecylamine, didodecylamine, cyclohexylamine, aniline, meta phenylene diamine, etc., and in such instances even ammonia, or other inorganic bases such as alkali and alkaline earth with metal hydroxides and salts. While these basically reacting substances are not effective by themselves to inhibit dust formation, they do improve the resistance to dust formation in compositions of the acidic air-blown asphalt and dust inhibitor. Normally 0.2% to 1% by weight of the added basic reacting material of the soluble type is sufficient.

Examples are given hereinbelow to illustrate the advantages of the improved thin asphaltic coating compositions of the present invention. A. S. T. M. Test Method D529-39T, is a procedure for evaluating the resistance of thin coatings under accelerated weathering conditions. Briefly, in the several cycles used in this test method the procedure comprises exposing an asphalt coating on a steel panel to periods of a carbon arc lamp of high intensity, a water spray or mist, and cold. Cycle A of the A. S. T. M. test method modified by omitting the cold period is known as the "Atlas Test," which was employed in the following examples:

*Example 1.*—Various asphalts were compounded with 1% thiodiphenylamine (phenothiazine), and panel coatings of the resulting compositions along with uncompounded asphalts for comparison were subjected to the Atlas weathering tests to illustrate the effectiveness of the dust inhibitor in the various asphalts. The results are given in the following Table I, the asphalts from the several crude sources being air-blown to the indicated melting points (the asphalts H and I both contained 17% of a finely-powdered diatomaceous earth of which about 80% has a particle size of 1-4 microns, the material being a product of the Dicalite Division of the Great Lakes Carbon Corporation and designated by them as "Dicalite SA-3"; the indicated melting points are those of the mixtures):

*Table I*

| Test No. | Asphalt | Melting Point (° F.) | Inhibitor Added | Cycles to Incipient Dusting |
|---|---|---|---|---|
| 1 | A | 225 | No | 3 |
| 2 | A | 225 | Yes | <38 |
| 3 | B | 222 | No | 3 |
| 4 | B | 222 | Yes | 34 |
| 5 | C | 220 | No | 3 |
| 6 | C | 220 | Yes | 15 |
| 7 | D | 223 | No | 3 |
| 8 | D | 223 | Yes | 38 |
| 9 | E | 222 | No | 4 |
| 10 | E | 222 | Yes | <38 |
| 11 | F | 182 | No | 6 |
| 12 | F | 182 | Yes | <38 |
| 13 | G | 197 | No | 3 |
| 14 | G | 197 | Yes | 28 |
| 15 | H | 190 | No | 3 |
| 16 | H | 190 | Yes | 30 |
| 17 | I | 189 | No | 3 |
| 18 | I | 189 | Yes | 32 |
| 19 | J | 223 | No | 6 |
| 20 | J | 223 | Yes | 24 |
| 21 | K | 225 | No | 6 |
| 22 | K | 225 | Yes | 36 |

*Example 2.*—An air-blown asphalt having a penetration at 77° F. of about 20 and a melting point of about 192° F. was compounded with 1% by weight of various agents, and coatings thereof on panels were subjected to the accelerated weathering test with the following results:

*Table II*

| Test No. | Additive | Cycles to Incipient Dusting |
|---|---|---|
| 23 | Thio-diphenylamine | 25 |
| 24 | N,N'-diphenyl-p-phenylenediamine | 28 |
| 25 | p-Isopropoxydiphenylamine | 21 |
| 26 | None | 3 |

*Example 3.*—To illustrate the synergistic enhancement of the effect of the dust inhibitors such as thio-diphenylamine by the auxiliary basic-reacting materials, the following Atlas weathering test results are given. Therein an acidic air-blown asphalt having a melting point of about 230° F. was compounded with basic-reacting materials such as limestone and aliphatic amines. A diatomaceous earth extender is added along with the aliphatic amine to show that the result is not merely from the physical effect of an extender.

*Table III*

| Test No. | Additive | Cycles to Incipient Dusting |
|---|---|---|
| 27 | None | 3 |
| 28 | 20% limestone | 2 |
| 29 | 1% thio-diphenylamine | 35 |
| 30 | 20% limestone+0.5% thio-diphenylamine | 45 |
| 31 | 15% diatomaceous earth | 2 |
| 32 | 15% diatomaceous earth+0.5% polyethylene polyamine molecular weight of about 1800 | 2 |
| 33 | 15% diatomaceous earth+0.5% polyethylene polyamine+0.5% thio-diphenylamine | 24 |
| 34 | 0.5% thio-diphenylamine | 18 |
| 35 | 15% diatomaceous earth+0.5% thio-diphenylamine | 8 |

I claim:

1. An asphaltic composition suitable for producing thin protective coatings of improved resistance to dusting, which comprises an asphalt and a small amount, from about 0.025% to about 5% of said asphalt, of a dust inhibiting diphenylamine having a polar substituent on at least one of said phenyl rings and is selected from the group consisting of thio-diphenylamine, N,N'-diphenyl-para-phenylene diamine, and para-isopropoxy diphenylamine.

2. A superior asphaltic coating composition comprising an asphalt having a softening point in the range of 200 to 250° F. and normally tending to form dust rapidly on the surface thereof and a small amount, from about 0.025% to about 5% of said asphalt, sufficient to inhibit substantially said dust formation, of a diphenyl amine which has a polar substituent on at least one of said phenyl rings and which is selected from the group consisting of thio-diphenylamine, N,N'-diphenyl-para-phenylene diamine, and para-isopropoxy diphenylamine.

3. An improved asphaltic coating composition of superior resistance to dust formation which comprises an acidic asphalt resulting from catalyzed air-blowing, a small amount, from about 0.025% to about 5% of said asphalt, sufficient to inhibit substantially dust formation, of a diphenyl amine which has a polar substituent on at least one of said phenyl rings and which is selected from the group consisting of thio-diphenylamine, N,N'-diphenyl-para-phenylene diamine, and para-isopropoxy diphenylamine, and a small amount, from about 0.02% to about 1%, sufficient by itself to neutralize substantially the acidic material in said asphalt, of a basically-reacting material.

4. An asphaltic composition suitable for forming thin protective coatings of superior resistance to dust formation, which composition comprises an asphalt normally tending to form dust on the surface thereof and a small amount, from about 0.025% to about 5% of said asphalt, sufficient to inhibit substantially said dust formation, of thio-diphenylamine.

5. An asphaltic composition suitable for forming thin protective coatings of superior resistance to dust formation, which composition comprises an asphalt normally tending to form dust on the surface thereof and a small amount, from about 0.025% to about 5% of said asphalt, sufficient to inhibit substantially said dust formation, of N,N'-diphenyl-para-phenylene diamine.

6. An asphaltic composition suitable for forming thin protective coatings of superior resistance to dust formation, which composition comprises an asphalt normally tending to form dust on the surface thereof and a small amount, from about 0.025% to about 5% of said asphalt, sufficient to inhibit substantially said dust formation, of para-isopropoxy diphenylamine.

References Cited in the file of this patent
UNITED STATES PATENTS 2,340,640    Burk _____ Feb. 1, 1944

OTHER REFERENCES

Handbook of Chemistry and Physics, 1954–55, page 1170.
41 C. A., 9025, bottom middle column.
47 C. A., 1596.
First Decennial, 4573.
Fourth Decennial, 9402.